United States Patent [19]
Bridges et al.

[11] Patent Number: 6,055,584
[45] Date of Patent: Apr. 25, 2000

[54] PROCESSOR LOCAL BUS POSTED DMA FLYBY BURST TRANSFERS

[75] Inventors: Jeffrey Todd Bridges, Raleigh; Edward Hammond Green, III, Cary; Richard Gerard Hofmann, Cary; David Otero, Cary; Mark Michael Schaffer, Cary; Dennis Charles Wilkerson, Durham, all of N.C.

[73] Assignee: International Business Machines Corporation, Armonk, N.Y.

[21] Appl. No.: 08/975,540

[22] Filed: Nov. 20, 1997

[51] Int. Cl.[7] .................................................. G06F 12/00
[52] U.S. Cl. ............................................. 710/27; 710/128
[58] Field of Search ................................. 710/22–28, 128

[56] References Cited

U.S. PATENT DOCUMENTS

| | | | |
|---|---|---|---|
| 5,007,012 | 4/1991 | Dujari | 364/900 |
| 5,056,011 | 10/1991 | Yoshitake et al. | 364/200 |
| 5,280,623 | 1/1994 | Sodos et al. | 395/325 |
| 5,325,495 | 6/1994 | Mitsuhira et al. | 395/275 |
| 5,438,666 | 8/1995 | Craft et al. | 395/842 |
| 5,634,076 | 5/1997 | Garde et al. | 395/842 |
| 5,761,533 | 6/1998 | Aldereguia et al. | 395/845 |
| 5,768,550 | 6/1998 | Dean et al. | 395/309 |
| 5,809,333 | 9/1998 | Story et al. | 395/842 |
| 5,862,353 | 1/1999 | Revilla et al. | 395/287 |
| 5,884,051 | 3/1999 | Schaffer et al. | 395/287 |

FOREIGN PATENT DOCUMENTS

WO 93/12486  6/1993  European Pat. Off. ........ G06F 13/40

Primary Examiner—Ayaz R. Sheikh
Assistant Examiner—Jigar Pancholi
Attorney, Agent, or Firm—John D. Flynn; Ronert V. Wilder

[57] ABSTRACT

A method and implementing system are provided which includes a DMA controller coupled to a slave bus controller through a processor local bus. The slave bus controller is also coupled to a memory unit. The memory unit is connected directly to a peripheral device. The DMA controller is arranged to receive a data transfer request from the peripheral unit and initiate a transfer cycle with the slave bus controller. The slave bus controller is selectively operable to assert a transfer signal to the memory unit which enables data movement directly between memory and the peripheral device in accordance with the request from the peripheral device. Upon completion of the address transfer and prior to the completion of the data transfer, the slave bus controller generates a transfer complete signal back to the peripheral device. This technique allows for a DMA FlyBy transfer to be overlapped with a subsequent processor local bus transfer.

35 Claims, 5 Drawing Sheets

PROCESSOR LOCAL BUS POSTED DMA FLYBY BURST TRANSFERS

RELATED APPLICATIONS

The present application is related to co-pending applications entitled "METHODS AND ARCHITECTURES FOR OVERLAPPED READ AND WRITE OPERATIONS", Attorney Docket RA9-96-066, filed on Oct. 3, 1996, and "SLAVE BUS CONTROLLER POSTED DMA TRANSFERS", Attorney Docket RA9-97-059, filed on even date herewith, both assigned to the assignee of the present application and included herein by reference.

FIELD OF THE INVENTION

The present invention relates generally to information processing systems and more particularly to an improved device for processing data transfers in a computer system.

BACKGROUND OF THE INVENTION

Computer systems have historically included at least one main electronics enclosure which is arranged to have mounted therein a plurality of circuit boards. The circuit boards, in turn, typically include a large number of integrated circuits (ICs) or so called "chips". With continuing advances in circuit integration and miniaturization, more and more of the individual chips are being integrated into fewer "full function" chips which include more functionality in less space.

As chip densities continue to increase, more of the computer system functions such as audio, video, and graphics, which have heretofore been normally coupled to a processor at the card level, are now being integrated onto the same IC as the system processor. With this increase in the number of functions being combined in a single IC, the bandwidth requirements of on-chip busses have also increased. As a result, several "on-chip" bus architectures are being developed to address the on-chip communication of processor cores and peripherals.

Most of the on-chip architectures have used the same bus architecture techniques that have been used for off-chip busses. For example, a single data bus is normally used for both read and write operations. Master and slave devices attached to the bus share the common read/write data bus. That technique is the most widely used architecture due to the limited I/O that are available at the chip boundary of the bus masters and slaves. Several bus architectures even share one common bus for the address transfer as well as read and write data transfers. That methodology requires that the address transfer phase be performed prior to the data transfer phase, which, in turn, reduces the bandwidth of the bus.

An on-chip bus is not limited by the number of I/O that an interface may contain. Many of the off-chip architectures have been optimized to reduce the number of I/O pins due to package constraints and degrade the performance of the bus as a result. On-chip busses may have many more interface signals without the associated cost of high pin count packages. Separate address, read data and write data busses are also feasible since the penalty for additional I/O is reduced. As a result, new bus architectures are being developed which take advantage of separate read and write data busses. An implementation of such an architecture is the so-called Processor Local Bus or PLB architecture. The PLB design contains a processor, a DMA controller, an on-chip peripheral bus (OPB) bridge, and external bus interface unit.

In the design of an embedded processor, an on-chip bus architecture is required to provide high bandwidth for the processor and for the Direct Memory Access (DMA) controller to access memory as well as internal and external DMA peripherals. The external DMA peripherals reside off-chip on the memory data bus. The internal DMA peripherals reside on an on-chip peripheral bus (OPB). The external bus interface controller (EBIU) connects the external bus to the processor local bus (PLB). The OPB bridge connects the PLB to the OPB.

Typically, data transfers across the external bus or the OPB require internal buffering by the EBIU or OPB bridges. This sequential transfer process involves two separate transfer cycles on the processor bus. Accordingly, there is a need for an enhanced method and processing apparatus which is effective to enhance the data transfer performance by reducing the processor bus utilization required by a DMA to service peripheral devices.

SUMMARY OF THE INVENTION

A method and apparatus is provided which allows a DMA FlyBy burst transfer to be completed on a processor local bus in a single cycle. By using two additional sideband signals, the DMA FlyBy burst transfer can be controlled by the DMA and EBIU or OPB bridge without the use of the processor local bus. Thus, the data transfer performance of the bus interface is significantly improved by reducing the overall processor local bus utilization by the DMA to service peripheral devices. In one embodiment, a method and implementing system are provided which include a DMA controller coupled to a slave bus controller. The slave bus controller is also coupled to a memory device. The memory device is connected directly to a peripheral unit on either an external bus or an on-chip peripheral bus. During a DMA FlyBy burst transfer, the data transfer occurs across the external or OPB bus and is not buffered internally by the EBIU or the OPB bridge. The DMA peripheral is controlled by the DMA controller while, simultaneously, the EBIU or OPB bridge is controlling the memory device. The advantages of using DMA FlyBy transfers are that no data buffering is required, the memory transfer and peripheral transfer occur simultaneously rather than in separate transfers, and the length of the burst is not limited by the size of the EBIU or OPB bridge buffers. The DMA controller is arranged to receive a data transfer request from the peripheral unit and initiate a transfer cycle with the slave bus controller. The DMA controller requests, by means of the TQuals signals, a DMA FlyBy type of transfer. The slave bus controller is selectively operable to initiate a data transfer operation to enable data to flow directly between the peripheral device and the memory unit as requested by the peripheral device. Upon completion of the data transfer, the slave bus controller generates a transfer complete signal back to the peripheral device.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
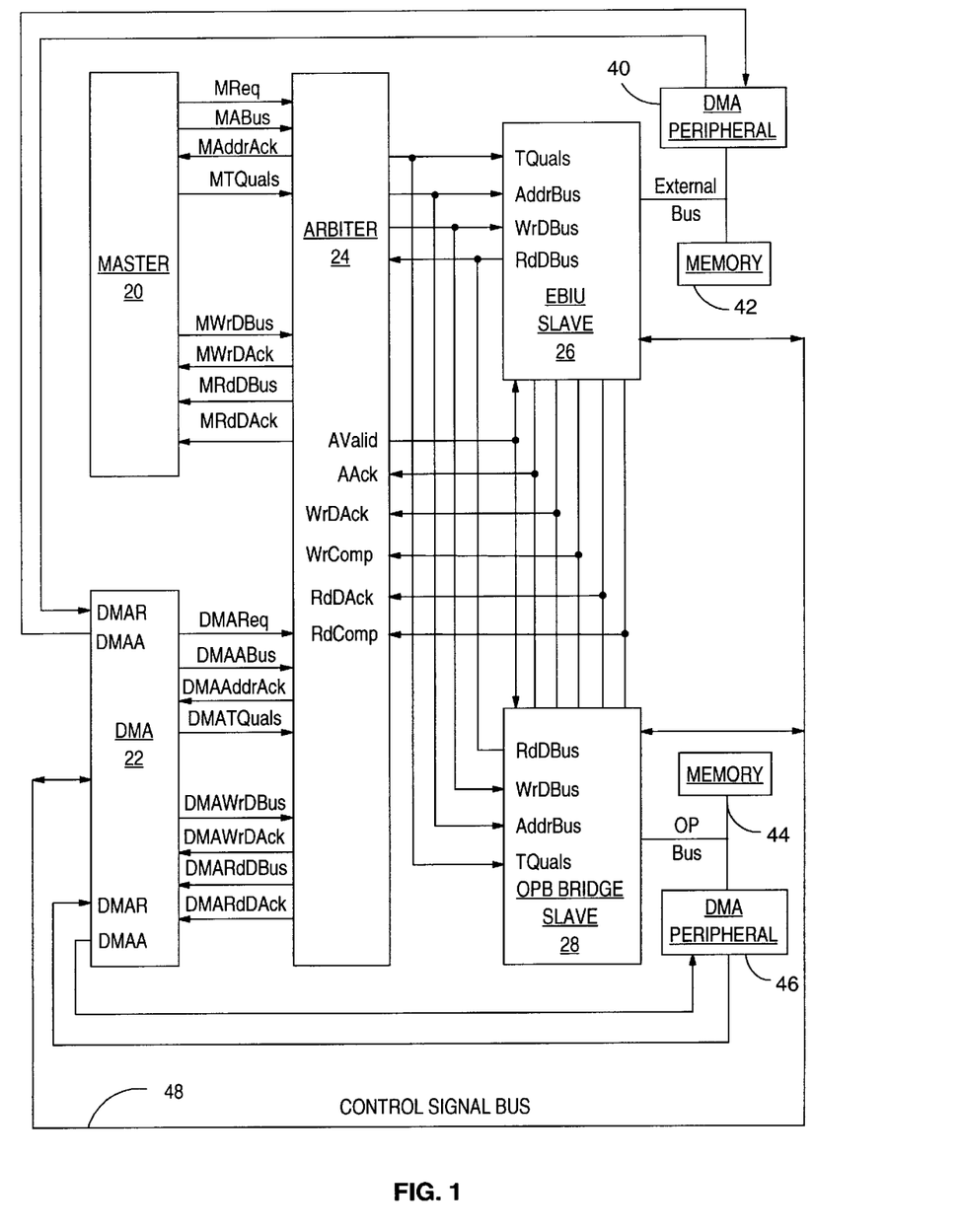
FIG. 1 is a simplified block diagram illustrating the configuration of an exemplary processor local bus or PLB architecture including the PLB DMA Controller and related devices.

With reference to FIG. 1, a simplified schematic diagram of a PLB system in which an exemplary embodiment of the present invention may be implemented, is illustrated. The illustration shows the major components of an exemplary system sufficient to enable a thorough understanding of the present invention, and non-material circuit details have been omitted in order not to obfuscate the presentation and understanding of the concepts herein presented. Although the present example describes a bus architecture as it relates to PLB DMA FlyBy Burst transfers, it is noted that the present invention applies to other systems as well, including systems which have been developed with or without separate read and write data buses.

In FIG. 1, there is shown a bus master device 20 connected to an arbiter unit 24. Another master device, i.e. DMA controller device 22, is also connected to the arbiter 24. An External Bus Interface Unit (EBIU) slave device 26 is connected to the arbiter 24. An On Chip Peripheral Bus (OPB) bridge slave device 28 is connected to the EBIU slave 26 and also to the arbiter 24 through a series of bus configurations including a read data bus (RdDBus), an address bus (AddrBus), a write data bus (WrDBus) and a transfer qualifier signal bus (TQuals). The transfer qualifier signals which are received by the EBIU slave device 26 and the OPB slave device 28 from the arbiter 24 and contain information concerning whether a transfer for which an address is present on the bus is a read or a write transfer, the size of the transfer, the type of the transfer i.e. byte aligned, byte or burst, byte enable for the transfer, the priority or order for the transfer, speculation memory access information or other information about a particular transfer. Because the transfer qualifier information is provided to the slave devices 26 and 28, multiple cycle transfers may be initiated with a single address. For example, by providing an initial address to a slave device and providing the type of transfer and the number of bytes to be transferred, a block of data may be transferred to or from the slave devices over multiple cycles on the data buses with only a single address placed on the address bus.

The slave devices 26 and 28 are also coupled to the arbiter 24 by a series of signal lines for communicating various control signals including AValid (address valid), AAck (address acknowledge), WrDAck (write data acknowledge), WrComp (write complete), RdDAck (read data acknowledge) and RdComp (read complete).

The master device 20 and the arbiter 24 are connected by a series of signal lines for communicating various control signals including MReq (master request), MABus (master address bus), MAddrAck (master address acknowledge), MTQuals (master transfer qualifiers), MWrDBus (master write data bus), MWrDAck (master write data acknowledge), MRdDBus (master read data bus) and MRdDAck (master read data acknowledge).

The DMA device 22 is coupled to the arbiter 24 by a series of signal lines for communicating various control signals including DMAReq (DMA request), DMAABus (DMA address bus), DMAAddrAck (DMA address acknowledge), DMATQuals (DMA transfer qualifiers), DMAWrDBus (DMA write data bus), DMAWrDAck (DMA write data acknowledge), DMARdDBus (DMA read data bus) and DMARdDAck (DMA read data acknowledge).

The EBIU slave device 26 is connected to an external bus which connects a DMA peripheral device 40 with a memory unit 42. The OPB Bridge slave device 28 is connected to an on-chip peripheral bus in the present example, which connects a memory unit 44 and a DMA peripheral device 46. The DMA controller 22 is coupled to the DMA peripheral device 40 and the DMA peripheral device 46 through separate sets of control signal lines for communicating DMAR and DMAA signals between each peripheral device and the DMA controller 22. In addition, there is a control signal bus 48 connected between the DMA controller 22 and the EBIU slave device 26 and the OPB Bridge slave device 28 for communicating various control signals including RdDataXfer (read data transfer), WrDataXfer (write data transfer), DMA BurstTerm (DMA burst terminate), DMA_endOp (DMA end operation), DMA_dataXfer (DMA data transfer) and DMA_flyByBurst (DMA FlyBy burst). The first three of these signals i.e. RdDataXfer, WrDataXfer, and DMABurstTerm, are selectively generated by the slave devices 26 and 28 and applied to the DMA controller 22 while the last three of the signals on the control signal bus 48 i.e. DMA_endOp, DMA_dataXfer, and DMA_flyByBurst, are selectively generated by the DMA controller and applied to the EBIU slave device 26 and the OPB Bridge slave device 28.

The following signal names and functions are used in explaining typical operational sequences in the described exemplary embodiment of the present invention.

A DMA "Request" signal, or DMA PLB Bus Request, is asserted by the DMA to request a data transfer across the PLB Bus. When the Request signal is asserted, all of the DMA's transfer qualifiers are valid.

An "Address" or ABus signal represents a 32-bit DMA memory address. The PLB slave must latch this address at the end of the cycle in which it asserts an "AAck" signal.

An Address Acknowledge signal "AAck" indicates that the slave has acknowledged the address and will latch the address and all of the transfer qualifiers at the end of the current cycle.

"Transfer Qualifiers" or "TQuals" are signals driven by the DMA and are valid at any time that the Request signal is active. The TQuals signals are used to indicate to the bus slave device various characteristics or qualifications of the transfer such as the direction of transfer, the size of the transfer and the type of the transfer (including a FlyBy type of transfer).

The "Address Valid" or "AValid" signal is asserted by the PLB arbiter to indicate to the slaves that there is a valid address and transfer qualifiers on the Bus. All bus slaves sample this signal and if the address is within a slave's address range and the particular slave is capable of performing the transfer, the slave responds by asserting its AAck signal.

The Write Data Bus or "WrDBus" is a 32-bit data bus in the present example, which is used to transfer data during write operations from the Bus Masters to the Bus Slaves. The Write Data Bus is not used with FlyBy DMA operations.

The WrDAck signal is driven by bus slaves and is used for all write operations to indicate to the master that the data will be latched at the end of the current cycle. The WrDAck signal is not driven by the bus slave during Flyby DMA operations. Those types of operations are decoded from the transfer qualifiers during the address acknowledge cycle.

The Data Write Complete or "WrComp" signal is asserted by a slave device to indicate to the bus arbiter that a write transfer is complete and that all of the data has been latched by the slave device. The bus arbiter will use this signal to allow the next master's write request to be granted in the following cycle and thus assert the AValid signal and gate that master's write data on to the Write Data Bus.

The Read Data Bus or "RdDBus" is a 32-bit data bus which is used to transfer data during read operations from the Bus Slaves to the Bus Masters. The Read Data Bus is not used during FlyBy DMA operations.

The RdDAck signal is driven by bus slaves and is used for all read operations to indicate to the master that the data is valid on the Read Data Bus and must be latched at the end of the current cycle. The RdDAck signal is not driven by the bus slave during Flyby DMA operations. Those types of operations are decoded from the transfer qualifier signals during the address acknowledge cycle.

The Data Read Complete or "RdComp" signal is driven by bus slaves and is used to indicate to the bus arbiter that the read operation is complete.

The Read Data Transfer or "RdDataXfer" signal is a sideband signal and is driven by bus slaves to tell the DMA controller that the memory read transfer is complete. During DMA FlyBy burst transfers, this signal is asserted following the completion of each data transfer within the burst.

The Write Data Transfer or "WrDataXfer" sideband signal is driven by bus slaves to tell the DMA controller that the memory write transfer is complete. During DMA FlyBy burst transfers, this signal is asserted following the completion of each data transfer within the burst.

The DMA Peripheral Request or "DMAR" signal is driven by the DMA peripheral to request a read or write to the peripheral.

The DMA Peripheral Acknowledge or "DMAA" signal is driven by the DMA controller to indicate to the DMA peripheral to either drive data or latch data.

The DMA FlyBy Burst or "DMA_flyByBurst" signal will be driven by the DMA controller to the PLB slaves when a DMA FlyBy burst read or write transfer is acknowledged by a PLB slave device. The PLB slaves sample the DMA_flyByBurst signal in the clock cycle in which the PLB slave asserts either WrDataXfer or RdDataXfer to determine when to terminate the burst transfer. A high value indicates that the DMA requires additional bytes, half-words or words of data beyond the current transfer. A low value indicates that the current transfer is the last data that the DMA controller is requesting, and no further data transfers should be performed by the PLB slave.

The DMA Burst Terminate or "BurstTerm" signal is driven by a PLB slave during DMA FlyBy Burst transfers to indicate that the current burst transfer in progress must be terminated. In response to the assertion of the BurstTerm signal, the DMA controller will complete the DMA FlyBy transfer by negating the DMA_flyByBurst signal in the clock cycle following the next RdDataXfer or WrDataXfer.

Figure 2:
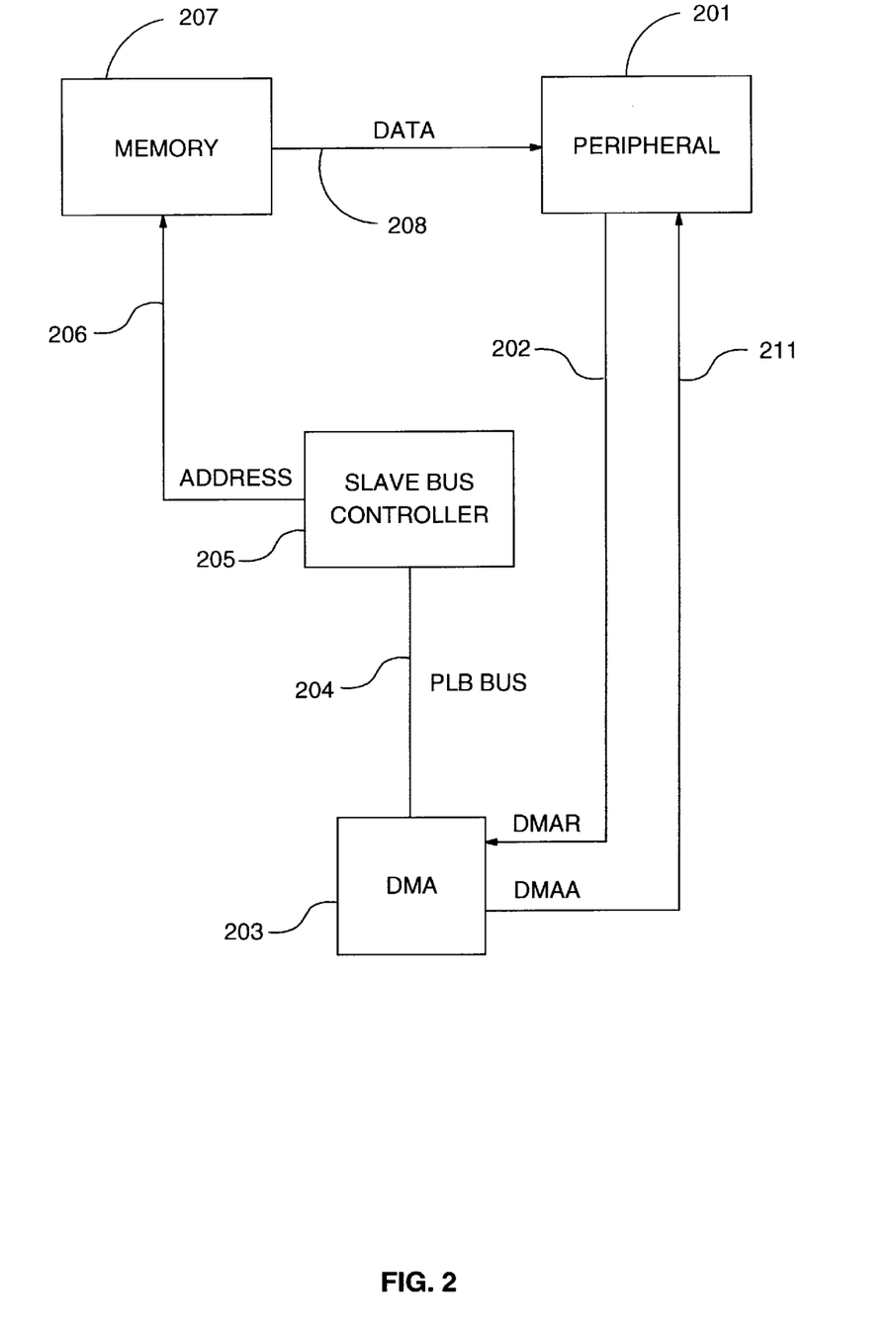
FIG. 2 is a simplified block diagram useful in explaining the operation of the key components of the system illustrated in FIG. 1 during a DMA FlyBy Burst memory to peripheral transfer.

In FIG. 2, the simplified block diagram is used to illustrate an exemplary functional flow or sequence of operations of the key components of the system illustrated in FIG. 1 during a DMA FlyBy Burst memory to peripheral transfer. Initially, a peripheral unit 201 generates a request DMAR 202 to a DMA controller 203 which is properly configured for a transfer on a designated channel. The DMA controller 203 then performs a PLB transfer cycle 204 with the transfer address. The DMA controller 203 provides a valid address and TQuals signals. The TQuals will indicate a flyby burst operation. Next a slave bus controller 205 acknowledges this cycle and initiates a memory read operation 206 on the slave bus. In addition, the slave bus controller 205 asserts the RdComp signal and releases control of the PLB. The DMA controller 203 then asserts the DMAA signal 211 to the peripheral 201 and data moves directly from memory 207 to the peripheral 201.

Figure 3:
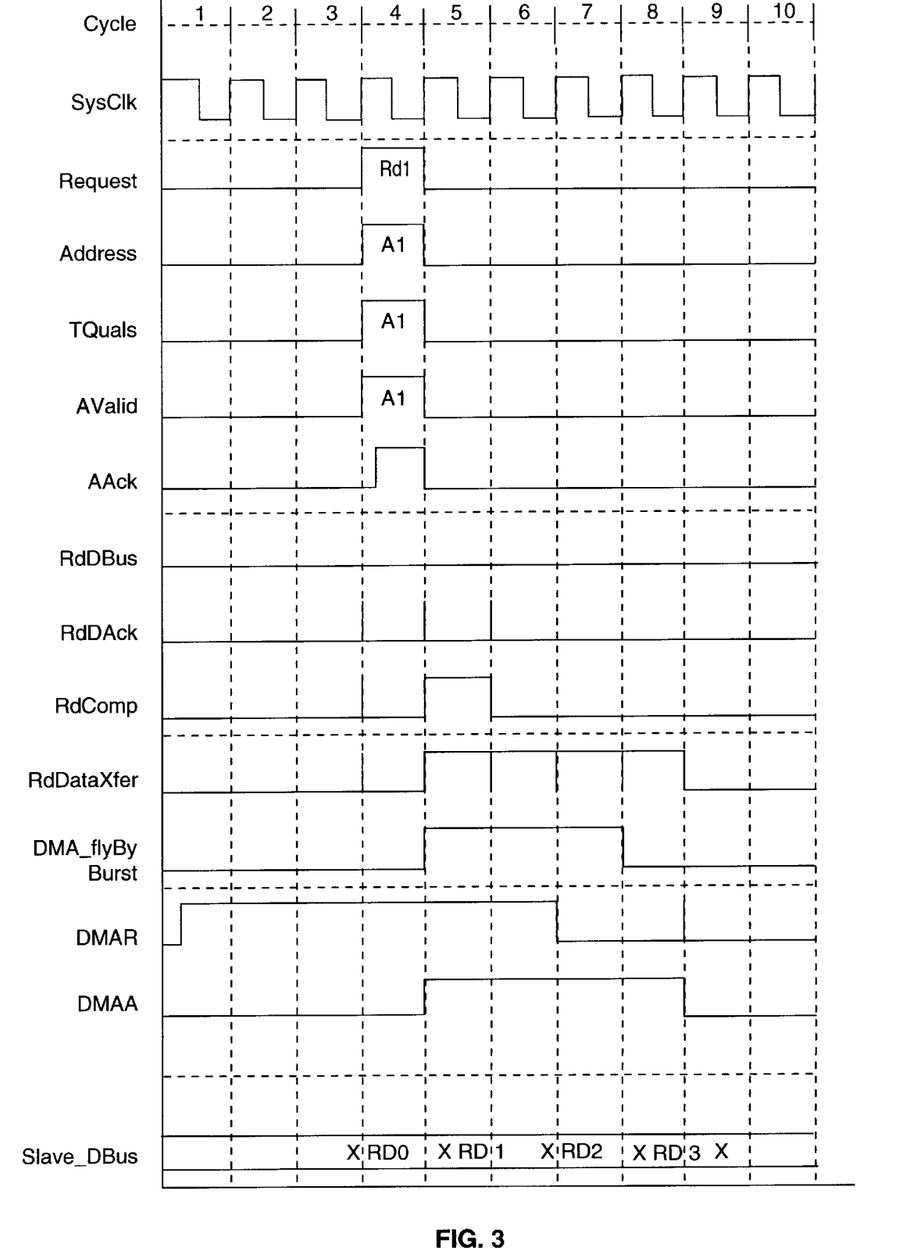
FIG. 3 is a simplified timing diagram illustrating various signal relationships during a typical operational cycle in a DMA FlyBy Burst memory to peripheral transfer.

In FIG. 3, a simplified timing diagram illustrates various signal relationships during a typical operational cycle in a DMA FlyBy Burst memory to peripheral transfer. The transfer begins by the DMA slave peripheral 201 asserting the DMAR signal. The DMA controller 203 responds by requesting a PLB read transfer. The PLB slave bus controller 205 decodes the address and transfer type on the PLB and acknowledges the request by asserting the AAck signal. Next, the DMA controller 203 asserts the DMAA signal and the PLB slave bus controller 205 begins a memory read from the requested address. Once the slave bus memory read is complete, the PLB slave bus controller 205 asserts the RdDataXfer signal and samples the DMA_flyByBurst signal to determine whether or not to continue the burst transfer. The burst transfer continues until the PLB slave bus controller 205 samples the DMA_flyByBurst signal negated and DMA negates DMAA in the following cycle. The RdComp signal is asserted in the clock cycle following the address acknowledge freeing-up the PLB bus after a single cycle and prior to the completion of the FlyBy Burst transfer. As indicated by the flatline RdDBus and RdDAck signals, no data is transferred across the PLB. Also, as indicated by the Slave_DBus signal, data is transferred directly from memory to the DMA peripheral in a single transfer.

Figure 4:
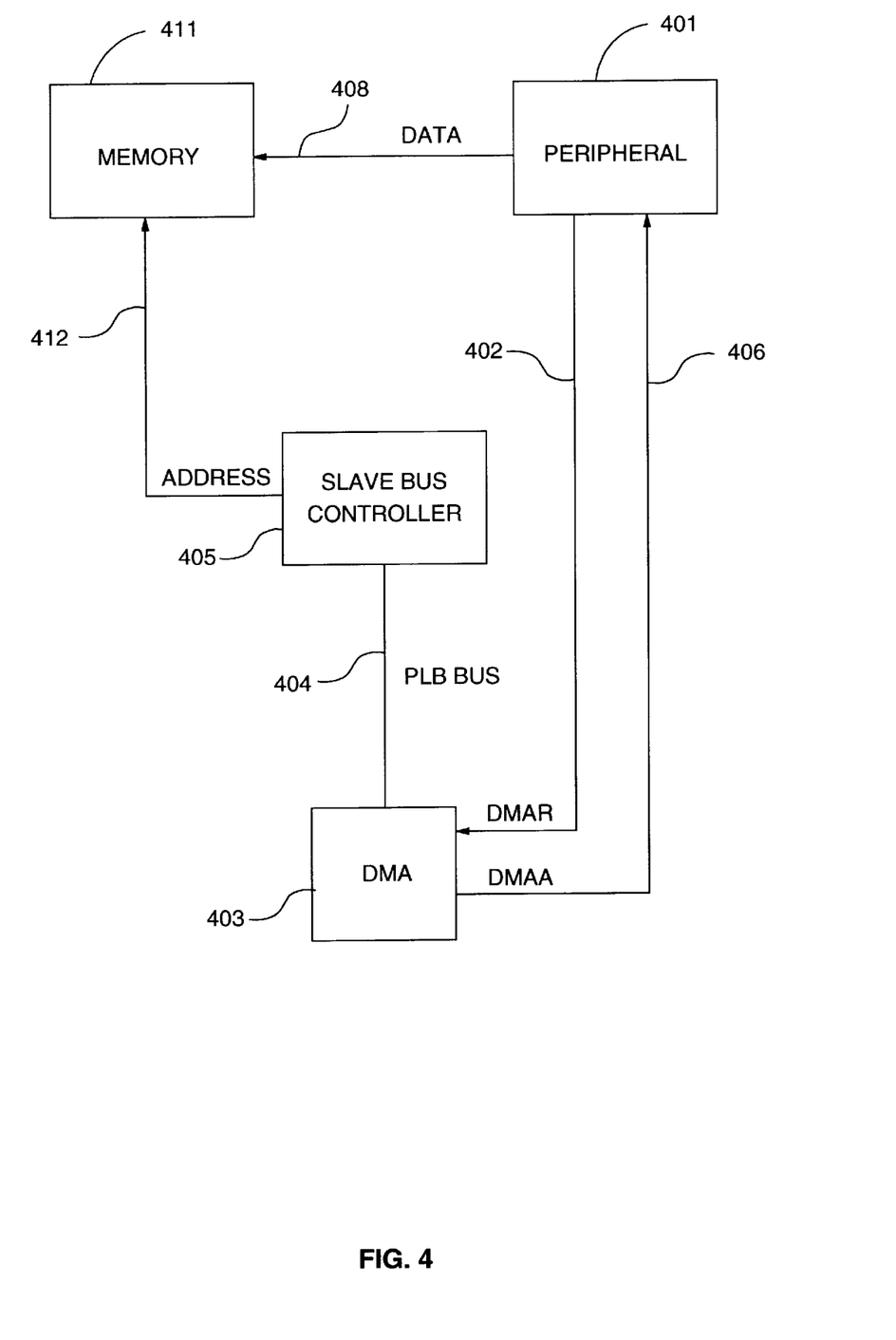
FIG. 4 is a simplified block diagram useful in explaining the operation of the key components of the system illustrated in FIG. 1 during a DMA FlyBy Burst peripheral to memory transfer.

In FIG. 4, is a simplified block diagram illustrates an exemplary flow or sequence of operations of the key components of the system illustrated in FIG. 1 during a DMA FlyBy Burst peripheral to memory transfer. A peripheral device 401 generates a request DMAR 402 to the DMA controller 403. The DMA controller then performs a PLB transfer cycle 404 with the transfer address. A slave bus controller 405 then acknowledges the cycle and the DMA controller 403 asserts the DMAA signal 406 to the peripheral 401. In addition, the slave bus controller 405 asserts the WrComp signal and releases control of the PLB bus. The peripheral device 401 drives data 408 onto the slave bus and the slave bus controller 405 performs a memory write operation 412 to the requested address within the stored data to the memory device 411.

Figure 5:
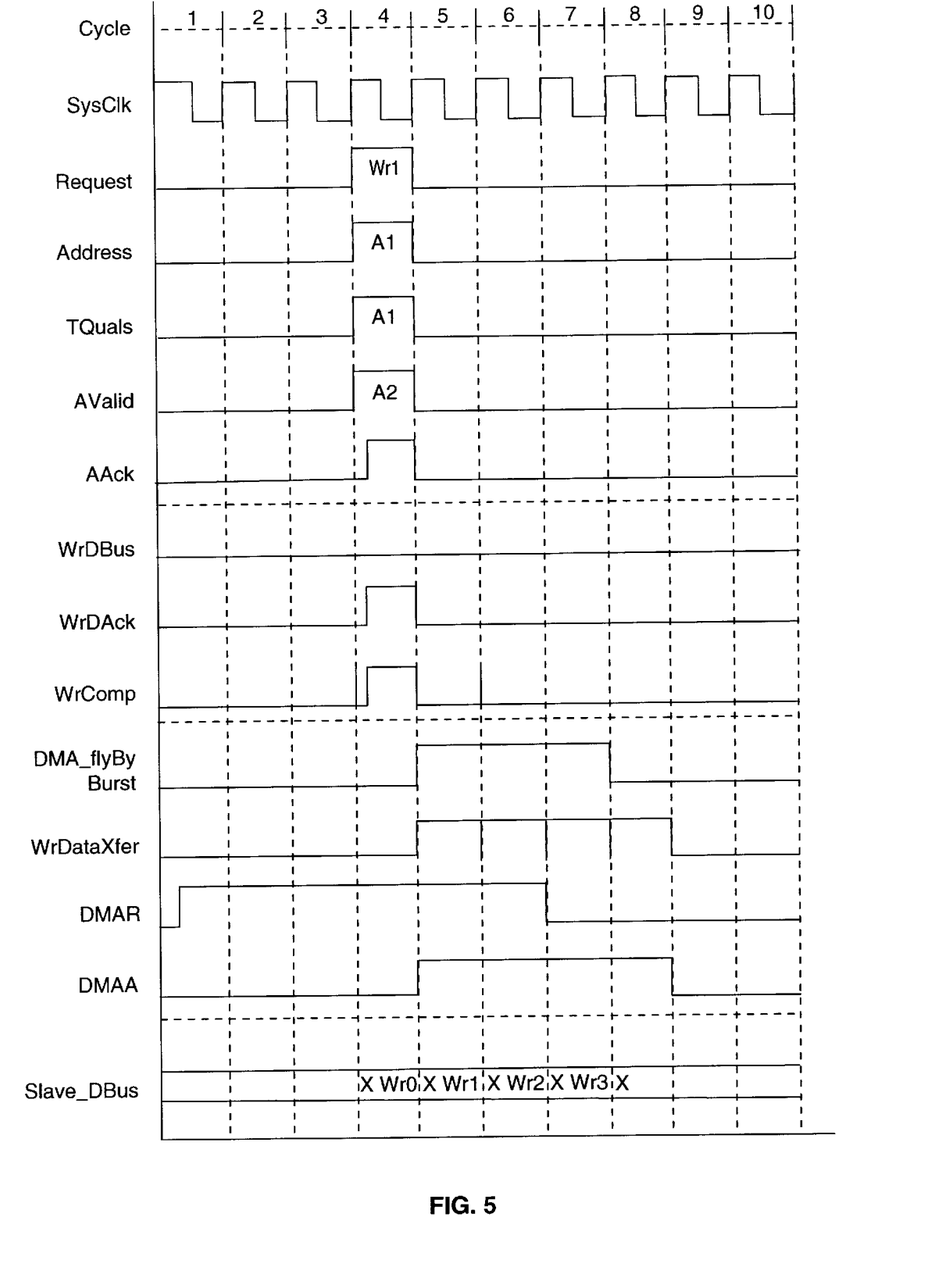
FIG. 5 is a simplified timing diagram illustrating various signal relationships during a typical operational cycle in a DMA FlyBy Burst peripheral to memory transfer.

FIG. 5 is a simplified timing diagram illustrating various signal relationships during an exemplary operational cycle in a DMA FlyBy Burst peripheral to memory transfer. The transfer begins when the DMA slave peripheral 401 asserts the DMAR signal 402. The DMA controller 403 responds by requesting a PLB write transfer. The PLB slave bus controller 405 decodes the address and transfer type on the PLB and acknowledges the request by asserting the AAck signal. Next, the DMA controller 403 asserts DMAA and the PLB slave bus controller 405 begins a memory write to the requested address. Once the slave bus memory write is complete, the PLB slave bus controller 405 asserts WrDataXfer and samples the DMA_flyByBurst signal to determine whether or not to continue the burst transfer. The burst transfer continues until the PLB slave controller samples the DMA_flyByBurst signal negated in the same cycle in which the PLB slave bus controller asserts WrDataXfer. The DMA controller then negates the DMAA signal in the following cycle to complete the final transfer of the burst. The WrComp signal is asserted in the clock cycle of address acknowledge AAck which frees-up the PLB bus after a single cycle and prior to the completion of the FlyBy transfer.

The present invention therefore eliminates the need to use the PLB bus control signals during the DMA FlyBy transfer. The term "flyby" is defined as a transfer of data directly between a peripheral device and a memory unit in which the data is transferred directly rather than buffered. Thus the PLB bus is only used for one cycle to transfer the request and transfer qualifiers to the PLB slave. The reduction in bus cycles by the DMA controller increases the overall bandwidth of the PLB bus. In addition, a PLB FlyBy transfer may now be performed simultaneously with other PLB transfers.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A data transfer system for accomplishing data transfers in an information processing system, said data transfer system comprising:
   a peripheral device;
   a first controller selectively coupled to said peripheral device;
   a memory unit;
   a primary bus;
   a secondary bus connected between said peripheral device and said memory unit, said secondary bus being separate from said primary bus; and
   a second controller connected to said first controller through said primary bus, said second controller being coupled to said memory unit, said second controller being selectively operable for controlling data transfers directly between said peripheral device and said memory unit over said secondary bus, said first controller being responsive to a data transfer request signal from said peripheral device for initiating a transfer cycle with said second controller, said second controller being responsive to said transfer cycle to selectively enable a data transfer directly between said memory unit and said peripheral device over said secondary bus, said second controller being operable to assert a transfer complete signal after said peripheral device acknowledges receipt of a transfer address, said transfer complete signal being operable to effect a release of said primary bus prior to a completion of said data transfer over said secondary bus.

2. The data transfer system as set forth in claim 1 wherein said data transfer is in a direction from said memory unit to said peripheral device.

3. The data transfer system as set forth in claim 1 wherein said data transfer is in a direction from said peripheral device to said memory unit.

4. The data transfer system as set forth in claim 1 wherein said first controller is a DMA controller.

5. The data transfer system as set forth in claim 1 wherein said second controller is a slave bus controller.

6. The data transfer system as set forth in claim 1 wherein said first controller is a DMA controller and said second controller is a slave bus controller.

7. The data transfer system as set forth in claim 1 wherein said first controller is operable to return an request acknowledge signal to said peripheral device after receiving said data transfer request.

8. The data transfer system as set forth in claim 7 wherein said request acknowledge signal is returned to said peripheral device after said transfer cycle has been initiated by said first controller.

9. The data transfer system as set forth in claim 8 wherein said peripheral device is responsive to said request acknowledge signal to allow said data transfer directly between said memory unit and said peripheral device in accordance with said data transfer request signal.

10. The data transfer system as set forth in claim 9 wherein said peripheral device is selectively operable to assert an address acknowledge signal after decoding a transfer address and transfer qualifications, said second controller being operable in a cycle following said assertion of said address acknowledge signal to assert a transfer complete signal, said transfer complete signal being operable to effect a release of control of said primary bus prior to a completion of said data transfer.

11. The data transfer system as set forth in claim 7 wherein said data transfer is in a direction from said memory unit to said peripheral device.

12. The data transfer system as set forth in claim 7 wherein said data transfer is in a direction from said peripheral device to said memory unit.

13. The data transfer system as set forth in claim 7 wherein said first controller is a DMA controller.

14. The data transfer system as set forth in claim 7 wherein said second controller is a slave bus controller.

15. The data transfer system as set forth in claim 7 wherein said first controller is a DMA controller and said second controller is a slave bus controller.

16. The data transfer system as set forth in claim 8 wherein said data transfer is in a direction from said memory unit to said peripheral device.

17. The data transfer system as set forth in claim 8 wherein said data transfer is in a direction from said peripheral device to said memory unit.

18. The data transfer system as set forth in claim 8 wherein said first controller is a DMA controller.

19. The data transfer system as set forth in claim 8 wherein said second controller is a slave bus controller.

20. The data transfer system as set forth in claim 8 wherein said first controller is a DMA controller and said second controller is a slave bus controller.

21. The data transfer system as set forth in claim 9 wherein said data transfer is in a direction from said memory unit to said peripheral device.

22. The data transfer system as set forth in claim 9 wherein said data transfer is in a direction from said peripheral device to said memory unit.

23. The data transfer system as set forth in claim 9 wherein said first controller is a DMA controller.

24. The data transfer system as set forth in claim 9 wherein said second controller is a slave bus controller.

25. The data transfer system as set forth in claim 9 wherein said first controller is a DMA controller and said second controller is a slave bus controller.

26. The data transfer system as set forth in claim 10 wherein said data transfer is in a direction from said memory unit to said peripheral device.

27. The data transfer system as set forth in claim 10 wherein said data transfer is in a direction from said peripheral device to said memory unit.

28. The data transfer system as set forth in claim 10 wherein said first controller is a DMA controller.

29. The data transfer system as set forth in claim 10 wherein said second controller is a slave bus controller.

30. The data transfer system as set forth in claim 10 wherein said first controller is a DMA controller and said second controller is a slave bus controller.

31. A method for transferring data in an information processing system, said method comprising:

receiving a data transfer request by a control device from a peripheral device, said peripheral device being coupled to a first bus;

initiating a transfer cycle to transfer an address associated with said data transfer request to a memory unit coupled to a second bus, said second bus being arranged to directly connect said peripheral device and said memory unit;

selectively enabling a data transfer directly between the memory unit and the peripheral device over said second bus; and releasing said first bus prior to a completion of said data transfer over said second bus.

32. The method as set forth in claim 31 wherein said data transfer is from said memory unit to said peripheral device.

33. The method as set forth in claim 31 wherein said data transfer is from said peripheral device to said memory unit.

34. The method as set forth in claim 31 and further including:

sending a data transfer request acknowledge signal from said control device to said peripheral device following said transfer cycle; and enabling said peripheral device to accomplish said data transfer after said data transfer request acknowledge signal has been received by said peripheral device.

35. The method as set forth in claim 34 wherein said control device includes a first controller coupled to said first bus and a second controller coupling said first bus and a second bus, said method further including:

sending a transfer complete signal from said second controller to said first controller after said enabling; and releasing control of said first bus by said second controller following said sending.

* * * * *